(12) United States Patent
Cagno et al.

(10) Patent No.: US 7,673,078 B2
(45) Date of Patent: Mar. 2, 2010

(54) COMMUNICATING CONFIGURATION INFORMATION OVER STANDARD INTERCONNECT LINK

(75) Inventors: Brian James Cagno, Tucson, AZ (US); Kenny Nian Gan Qiu, Tucson, AZ (US); Donald Scott Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 11/669,651

(22) Filed: Jan. 31, 2007

(65) Prior Publication Data

US 2008/0181235 A1 Jul. 31, 2008

(51) Int. Cl.
*G06F 3/00* (2006.01)
(52) U.S. Cl. .................................... 710/10; 710/8
(58) Field of Classification Search .............. 710/8, 710/10
See application file for complete search history.

(56) References Cited

U.S. PATENT DOCUMENTS

| | | | |
|---|---|---|---|
| 5,465,396 A | 11/1995 | Hunsinger et al. | |
| 6,418,121 B1 | 7/2002 | Flickinger et al. | |
| 7,054,972 B2 | 5/2006 | Parry et al. | |
| 7,149,397 B2* | 12/2006 | Popovic et al. | 385/134 |
| 7,317,934 B2* | 1/2008 | Xu et al. | 455/561 |
| 2002/0162010 A1 | 10/2002 | Allen et al. | |
| 2003/0208581 A1 | 11/2003 | Behren et al. | |
| 2004/0022306 A1 | 2/2004 | Baumgartner et al. | |
| 2004/0081187 A1* | 4/2004 | Warren et al. | 370/419 |
| 2004/0136721 A1 | 7/2004 | Giaretta et al. | |
| 2005/0089334 A1 | 4/2005 | Regev et al. | |
| 2005/0196109 A1 | 9/2005 | Kim et al. | |
| 2005/0213982 A1 | 9/2005 | Weber | |
| 2006/0025018 A1 | 2/2006 | Dube et al. | |
| 2007/0127920 A1* | 6/2007 | Ghiasi et al. | 398/25 |
| 2007/0133562 A1* | 6/2007 | Ghiasi | 370/395.42 |
| 2007/0223517 A1* | 9/2007 | Warren et al. | 370/463 |
| 2008/0050074 A1* | 2/2008 | Dallesasse et al. | 385/92 |

FOREIGN PATENT DOCUMENTS

| | | |
|---|---|---|
| WO | WO 00/28454 | 5/2000 |
| WO | WO 02/063800 A1 | 8/2002 |

* cited by examiner

*Primary Examiner*—Henry W. H. Tsai
*Assistant Examiner*—Eric T Oberly
(74) *Attorney, Agent, or Firm*—Stephen R. Tkacs; Stephen J. Walder, Jr.; Randall J. Bluestone

(57) ABSTRACT

A mechanism is provided for storage enclosures to communicate with one another using pre-existing cables allowing the user to dynamically attach different types and speeds of Fiber Channel enclosures together. The mechanism uses a transmit disable line and receive loss of signal line of a small form-factor pluggable optical cable to provide a communication link between enclosures before the Fiber Channel loop is setup and stable. The mechanism on the transmit side pulses the transmit disable line to communicate configuration information. The mechanism on the receive side receives the configuration information on the receive loss of signal line. The transmit disable line and the receive loss of signal line operate as a one-wire communication scheme, providing a communication link to communicate configuration information before the Fiber Channel loop is established.

18 Claims, 2 Drawing Sheets

COMMUNICATING CONFIGURATION INFORMATION OVER STANDARD INTERCONNECT LINK

BACKGROUND

1. Technical Field

The present application relates generally to an improved data processing system and method. More specifically, the present application is directed to communicating configuration information over a standard interconnect link.

2. Description of Related Art

Fibre Channel (FC) is a high-speed transport technology that is used to build storage area networks (SANs). Although Fibre Channel can be used as a general-purpose network carrying asynchronous transfer mode (ATM), Internet Protocol (IP), and other protocols, FC has been primarily used for transporting small computer system interface (SCSI) traffic from servers to disk arrays. The Fibre Channel Protocol (FCP) serializes SCSI commands into Fibre Channel frames. IP may be used for in-band simple network management protocol (SNMP) network management. Fibre Channel not only supports single-mode and multi-mode fiber connections, but coaxial cable and twisted pair as well.

Fibre Channel can be configured point-to-point, via a switched topology or in a FC arbitrated loop (FC-AL) with or without a hub. In FC disk enclosure systems, there may be multiple units cascaded using optical cables to form large storage systems. Usually, there is no communication between enclosures before a valid and stable FC signal has been established. The process of establishing an arbitrated loop is referred to as loop initialization process (LIP).

There are, however, many situations where a need exists for storage enclosures to communicate with each other before a stable FC link is established. For example, storage enclosures may need to communicate speed of FC links used for negotiation and types of enclosure system, such as controller or expansion, in order to configure the system correctly before a stable FC link can be established.

Currently, the best solution is static configurations. Before enclosures are connected to each other, a user must configure the systems correctly, such as by using information stored in vital product data (VPD) to establish the configuration. Such methods require user intervention, which is not dynamic and is susceptible to operator error.

SUMMARY

In one illustrative embodiment, a computer program product comprises a computer useable medium having a computer readable program. The computer readable program, when executed on a computing device, causes the computing device to send configuration information from a first storage enclosure to a second storage enclosure via an optical cable connecting the first storage enclosure and the second storage enclosure, sending the configuration information over a transmit disable line of a small form-factor pluggable connector of the optical cable by asserting and deasserting the transmit disable line of the small form-factor pluggable connector of the optical cable. The computer readable program further causes the computing device to receive configuration information from the second storage enclosure via the optical cable, receiving the configuration information from the second storage enclosure over a receive loss of signal line of the small form-factor pluggable connector of the optical cable by monitoring the receive loss of signal line of the small form-factor pluggable connector of the optical cable. The computer readable program further causes the computing device to configure the first storage enclosure to communicate with the second storage enclosure over the optical cable based on the configuration information received from the second storage enclosure.

In another illustrative embodiment, a storage enclosure comprises a switch, a small form-factor pluggable optical cable connector, and a control processor. The storage enclosure is a first storage enclosure connected to a second storage enclosure by an optical cable connected to the small form-factor pluggable optical cable connector. The control processor is connected to the switch. The control processor is connected to a transmit disable line and a receive loss of signal line of the optical cable connector. The control processor is configured to send configuration information from the first storage enclosure to the second storage enclosure via the optical cable, sending the configuration information over the transmit disable line of the small form-factor pluggable optical cable connector by asserting and deasserting the transmit disable line of the small form-factor pluggable optical cable connector. The control processor is configured to receive configuration information from the second storage enclosure via the optical cable, receiving the configuration information from the second storage enclosure over the receive loss of signal line of the small form-factor pluggable optical cable connector by monitoring the receive loss of signal line of the small form-factor pluggable optical cable connector. The control processor is further configured to configure the first storage enclosure to communicate with the second storage enclosure over the optical cable based on the configuration information received from the second storage enclosure.

In a further illustrative embodiment, a method is provided in a storage enclosure for communicating configuration information across an optical cable. The method comprises connecting a first storage enclosure to a second storage enclosure using an optical cable. A small form-factor pluggable connector of the optical cable has a transmit disable line and a receive loss of signal line. The method further comprises sending configuration information from the first storage enclosure to the second storage enclosure via the optical cable, sending the configuration information over the transmit disable line of the small form-factor pluggable connector of the optical cable by asserting and deasserting the transmit disable line of the small form-factor pluggable connector of the optical cable. The method further comprises receiving configuration information from the second storage enclosure via the optical cable, receiving the configuration information from the second storage enclosure over the receive loss of signal line of the small form-factor pluggable connector of the optical cable by monitoring the receive loss of signal line of the small form-factor pluggable connector of the optical cable. The method further comprises configuring the first storage enclosure to communicate with the second storage enclosure over the optical cable based on the configuration information received from the second storage enclosure.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
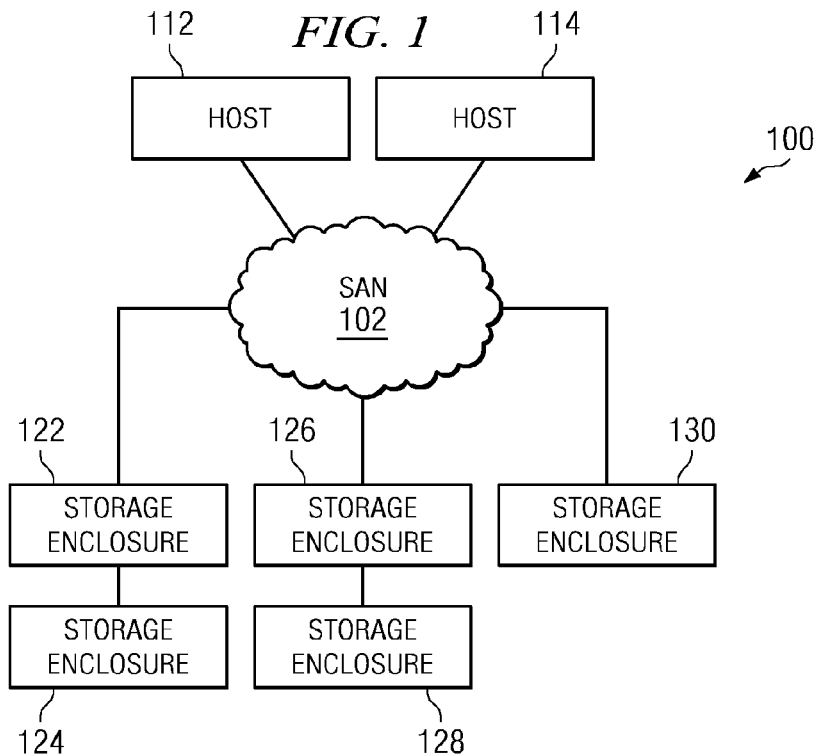
FIG. 1 depicts a pictorial representation of an exemplary distributed data processing system in which aspects of the illustrative embodiments may be implemented.

With reference now to the figures and in particular with reference to FIG. 1, an exemplary diagram of a data processing environment is provided in which illustrative embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environment may be made without departing from the spirit and scope of the present invention.

FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one storage area network (SAN) 102, which is the medium used to provide communication links between various devices and computers connected together within distributed data processing system 100. The storage area network 102 may include connections, such as wire, wireless communication links, or, in one embodiment, fiber optic cables.

In the depicted example, hosts 112 and 114 are connected to SAN 102. In addition, storage enclosures 122, 126, and 130 are also connected to network 102. Storage enclosure 124 is connected to storage enclosure 122, and storage enclosure 128 is connected to storage enclosure 126. Distributed data processing system 100 may include additional hosts, storage enclosures, and other devices not shown. Storage enclosures 122-130 may be, for example, Fibre Channel (FC) storage enclosures.

In one exemplary embodiment, storage enclosures 122-130 may be connected using fiber cables, such as optical small form-factor pluggable (SFP) cables. Having an optical interconnect has numerous advantages over copper interconnect solutions, including lower electromagnetic emissions, less bulky mechanicals allowing for robust strain relief and easier cable routing, and dramatically improved supported cable lengths supporting kilometers of cable distance versus just a few meters with existing SAS solutions. The problem that exists today is how to communicate configuration information between FC storage enclosures before a FC loop is established.

In accordance with an illustrative embodiment, a mechanism is provided for storage enclosures to communicate with one another using pre-existing cables allowing the user to dynamically attach different types and speeds of Fibre Channel enclosures together. The mechanism uses a transmit disable line and receive loss of signal line of a small form-factor pluggable optical cable to provide a communication link between enclosures before the Fibre Channel loop is setup and stable. The mechanism on the transmit side pulses the transmit disable line to communicate configuration information. The mechanism on the receive side receives the configuration information on the receive loss of signal line. The transmit disable line and the receive loss of signal line operate as a one-wire communication scheme, providing a communication link to communicate configuration information before the Fibre Channel loop is established.

Figure 2:
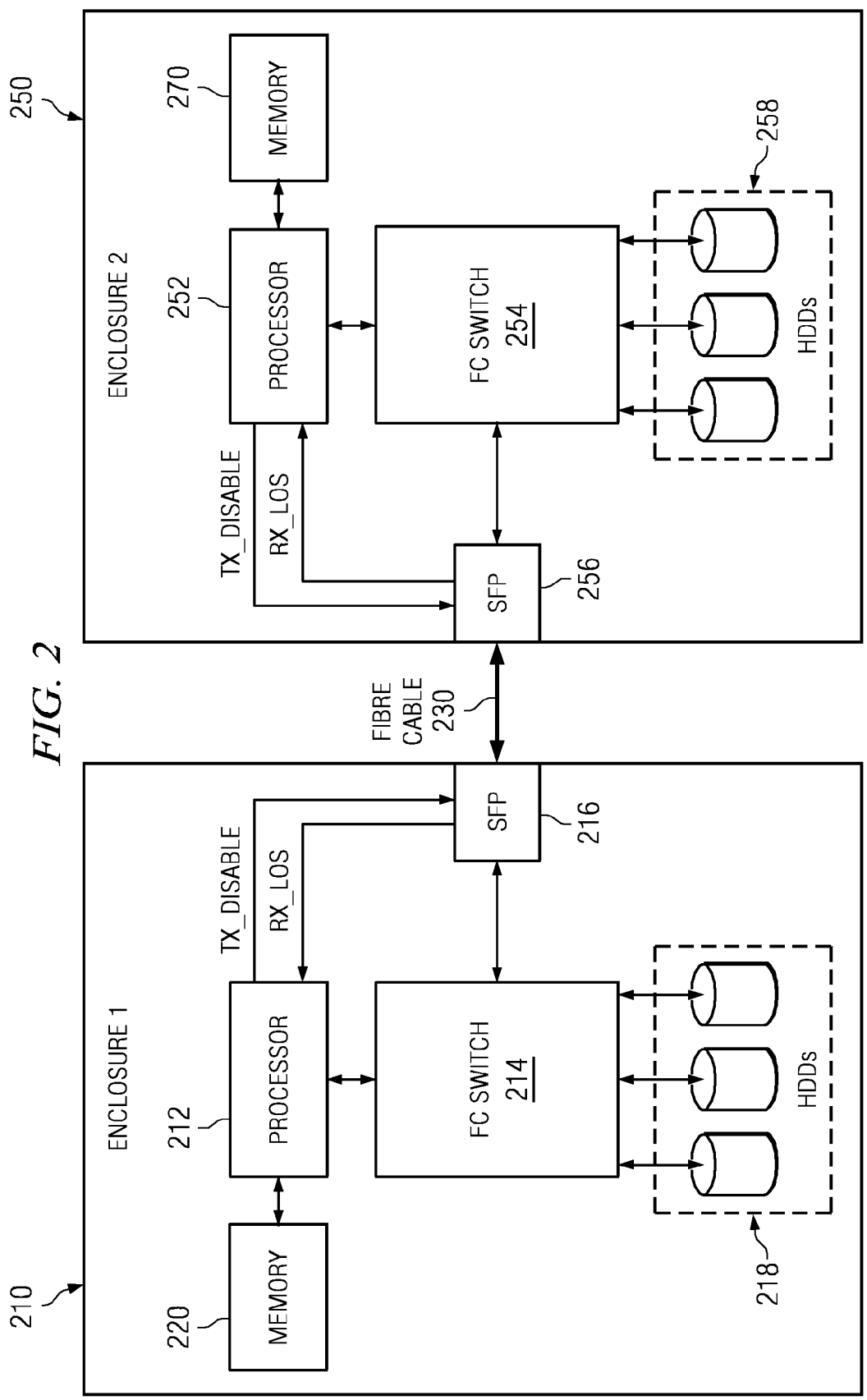
FIG. 2 is a block diagram illustrating storage enclosures with mechanisms for communicating configuration information over an optical small form-factor pluggable cable before a Fibre Channel loop is established in accordance with an illustrative embodiment.

FIG. 2 is a block diagram illustrating storage enclosures with mechanisms for communicating configuration information over an optical small form-factor pluggable cable before a Fibre Channel loop is established in accordance with an illustrative embodiment. Enclosure 1 210 comprises a plurality of hard disk drives (HDDs) 218 connected to FC switch 214. Enclosure 1 is connected to enclosure 2 via fiber cable 230. Enclosure 1 connects to fiber cable 230 using optical small form-factor pluggable (SFP) connector 216. Processor 212 is connected to FC switch 214 and memory 220. Processor 212 is also connected to the transmit disable line (TX_DISABLE) and receive loss of signal line (RX_LOS) of SFP connector 216.

Enclosure 2 250 comprises a plurality of HDDs 258 connected to FC switch 254. Enclosure 2 is connected to enclosure 2 via fiber cable 230. Enclosure 2 connects to fiber cable 230 using optical small form-factor pluggable (SFP) connector 256. Processor 252 is connected to FC switch 254 and memory 270. Processor 252 is also connected to the transmit disable line (TX_DISABLE) and receive loss of signal line (RX_LOS) of SFP connector 256.

In a typical SFP to SFP cabling scheme, the communication link will connect to an arbitrated loop or switch device with a controlling processor, such as processor 212 or processor 252, to oversee the link. In the embodiment illustrated in FIG. 2, once devices, enclosure 1 210 and enclosure 2 250 in this example, are powered on and the cables are inserted, the controlling processor, such as processor 212, keeps the cable link off the loop to ensure no disruption occurs behind the switch. Processor 212 and processor 252 may then communicate with each other by asserting and de-asserting the TX_DISABLE line, while monitoring the RX_LOS line. Processors 212 and 252 may use this communication scheme by pulsing the TX_DISABLE signal to communicate configuration information to the other enclosure. Once the enclosures are configured, each enclosure can start establishing FC links to allow FC traffic to be routed between FC switches.

Processor 212 in storage enclosure 1 210 or processor 252 in storage enclosure 2 250 may execute program instructions, such as firmware. For example, memory 220 or memory 270 may be read-only memory (ROM) devices that store firmware to be run on the processor. The program instructions may include configuration information and instructions that cause the processor to communicate over the TX_DISABLE line and monitor the RX_LOS line to communicate configuration information.

While the storage enclosures illustrated in FIG. 2 are Fibre Channel storage enclosure, a person of ordinary skill in the art will recognize that the exemplary aspects of the illustrative embodiment are not limited to Fibre Channel storage enclosures, protocol, or network fabrics. The illustrative embodiments may be modified to use other switches, protocols, cables, etc., without departing from the spirit and scope of the present invention.

Figure 3:
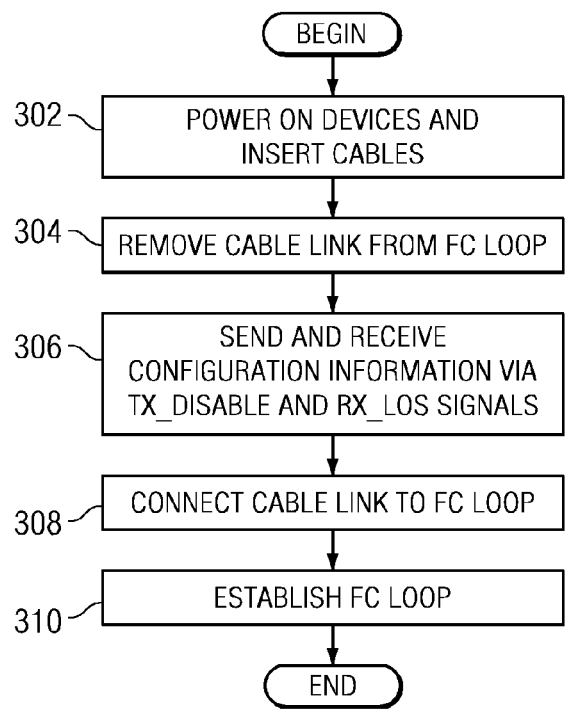
FIG. 3 is a flowchart illustrating an exemplary operation of communicating configuration information using pre-existing cables before a Fibre Channel loop is established in accordance with an illustrative embodiment.

FIG. 3 is a flowchart illustrating an exemplary operation of communicating configuration information using pre-existing cables before a Fibre Channel loop is established in accordance with an illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware, such as a state machine, and computer instructions.

Furthermore, the flowchart is provided to demonstrate the operations performed within the illustrative embodiments. The flowchart is not meant to state or imply limitations with regard to the specific operations or, more particularly, the order of the operations. The operations of the flowchart may be modified to suit a particular implementation without departing from the spirit and scope of the present invention.

With reference now to FIG. 3, operation begins and an operator powers on the devices and inserts cables (block 302). The controlling processor removes the cable link from the FC loop (block 304). Then, the control processor sends and receives configuration information via the transmit disable (TX_DISABLE) line and receive loss of signal (RX_LOS) line (block 306). The configuration information may comprise, for example, type of enclosure, speed of FC link, etc. The processor pulses the TX_DISABLE line to communicate the configuration information and monitors the RX_LOS line to receive configuration information from the other storage enclosure. When all configuration information is sent and received, and the FC link is configured, the processor connects the cable link to the FC loop (block 308) and establishes the Fibre Channel loop (block 310). Thereafter, operation ends.

While the flowchart in FIG. 3 discloses Fibre Channel loops and links, a person of ordinary skill in the art will recognize that the exemplary aspects of the illustrative embodiment are not limited to Fibre Channel storage enclosures, protocol, or network fabrics. The illustrative embodiments may be modified to use other switches, protocols, cables, etc., without departing from the spirit and scope of the present invention.

Thus, the illustrative embodiments solve the disadvantages of the prior art by providing a mechanism for storage enclosures to communicate with one another using pre-existing cables allowing the user to dynamically attach different types and speeds of Fibre Channel enclosures together. The mechanism uses a transmit disable line and receive loss of signal line of a small form-factor pluggable optical cable to provide a communication link between enclosures before the Fibre Channel loop is setup and stable. The mechanism on the transmit side pulses the transmit disable line to communicate configuration information. The mechanism on the receive side receives the configuration information on the receive loss of signal line. The transmit disable line and the receive loss of signal line operate as a one-wire communication scheme, providing a communication link to communicate configuration information before the Fibre Channel loop is established.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer useable medium having a computer readable program, wherein the computer readable program, when executed on a computing device, causes the computing device to:
send configuration information from a first storage enclosure to a second storage enclosure via an optical cable connecting the first storage enclosure and the second storage enclosure, sending the configuration information over a transmit disable line of a small form-factor pluggable connector of the optical cable by asserting and deasserting the transmit disable line of the small form-factor pluggable connector of the optical cable;
receive configuration information from the second storage enclosure via the optical cable, receiving the configuration information from the second storage enclosure over a receive loss of signal line of the small form-factor pluggable connector of the optical cable by monitoring the receive loss of signal line of the small form-factor pluggable connector of the optical cable; and
configure the first storage enclosure to communicate with the second storage enclosure over the optical cable based on the configuration information received from the second storage enclosure.

2. The computer program product of claim 1, wherein the first storage enclosure is a Fibre Channel storage enclosure comprising a Fibre Channel switch, wherein the computer readable program, when executed on the computing device, further causes the computing device to:
responsive to configuring the first storage enclosure, perform loop initialization process.

3. The computer program product of claim 2, wherein the computer readable program, when executed on the computing device, further causes the computing device to:
prior to sending configuration information, disconnect the optical cable from the Fibre Channel switch.

4. The computer program product of claim 3, wherein the computer readable program, when executed on the computing device, further causes the computing device to:
prior to performing loop initialization process, reconnect the optical cable to the Fibre Channel switch.

5. The computer program product of claim 1, wherein the configuration information sent from the first storage enclosure to the second storage enclosure comprises a speed of the first storage enclosure.

6. The computer program product of claim 1, wherein the configuration information sent from the first storage enclosure to the second storage enclosure comprises a type of the first storage enclosure.

7. A storage enclosure, comprising:
a switch;
a small form-factor pluggable optical cable connector, wherein the storage enclosure is a first storage enclosure connected to a second storage enclosure by an optical cable connected to the small form-factor pluggable optical cable connector; and
a control processor, wherein the control processor is connected to the switch and wherein the control processor is connected to a transmit disable line and a receive loss of signal line of the optical cable connector,
wherein the control processor is configured to send configuration information from the first storage enclosure to the second storage enclosure via the optical cable, sending the configuration information over the transmit disable line of the small form-factor pluggable optical cable connector by asserting and deasserting the transmit disable line of the small form-factor pluggable optical cable connector, receive configuration information from the second storage enclosure via the optical cable, receiving the configuration information from the second storage enclosure over the receive loss of signal line of the small form-factor pluggable optical cable connector by monitoring the receive loss of signal line of the small form-factor pluggable optical cable connector, and configure the first storage enclosure to communicate with the second storage enclosure over the optical cable based on the configuration information received from the second storage enclosure.

8. The storage enclosure of claim 7, wherein the first storage enclosure is a Fibre Channel storage enclosure and wherein the switch is a Fibre Channel switch, and wherein the control processor is configured to perform loop initialization process responsive to configuring the first storage enclosure.

9. The storage enclosure of claim 8, wherein the control processor is configured to disconnecting the optical cable from the Fibre Channel switch prior to sending configuration information.

10. The storage enclosure of claim 9, wherein the control processor is configured to reconnect the optical cable to the Fibre Channel switch prior to performing loop initialization process.

11. The storage enclosure of claim 7, wherein the configuration information sent from the first storage enclosure to the second storage enclosure comprises a speed of the first storage enclosure.

12. The storage enclosure of claim 7, wherein the configuration information sent from the first storage enclosure to the second storage enclosure comprises a type of the first storage enclosure.

13. A method in a storage enclosure for communicating configuration information across an optical cable, the method comprising:
connecting a first storage enclosure to a second storage enclosure using an optical cable, wherein a small form-factor pluggable connector of the optical cable has a transmit disable line and a receive loss of signal line;
sending configuration information from the first storage enclosure to the second storage enclosure via the optical cable, sending the configuration information over the transmit disable line of the small form-factor pluggable connector of the optical cable by asserting and deasserting the transmit disable line of the small form-factor pluggable connector of the optical cable;
receive receiving configuration information from the second storage enclosure via the optical cable, receiving the configuration information from the second storage enclosure over the receive loss of signal line of the small form-factor pluggable connector of the optical cable by monitoring the receive loss of signal line of the small form-factor pluggable connector of the optical cable; and
configuring the first storage enclosure to communicate with the second storage enclosure over the optical cable based on the configuration information received from the second storage enclosure.

14. The method of claim 13, wherein the first storage enclosure is a Fibre Channel storage enclosure comprising a Fibre Channel switch, the method further comprising:
responsive to configuring the first storage enclosure, performing loop initialization process.

15. The method of claim 14, further comprising:
prior to sending configuration information, disconnecting the optical cable from the Fibre Channel switch.

16. The method of claim 15, further comprising:
prior to performing loop initialization process, reconnecting the optical cable to the Fibre Channel switch.

17. The method of claim 13, wherein the configuration information sent from the first storage enclosure to the second storage enclosure comprises a speed of the first storage enclosure.

18. The method of claim 13, wherein the configuration information sent from the first storage enclosure to the second storage enclosure comprises a type of the first storage enclosure.

* * * * *